United States Patent
Tomoda

(10) Patent No.: US 8,428,837 B2
(45) Date of Patent: Apr. 23, 2013

(54) CLUTCH CONTROL SYSTEM

(75) Inventor: Akihiko Tomoda, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 783 days.

(21) Appl. No.: 12/428,744

(22) Filed: Apr. 23, 2009

(65) Prior Publication Data

US 2009/0287387 A1 Nov. 19, 2009

(30) Foreign Application Priority Data

May 13, 2008 (JP) ................................ 2008-126021

(51) Int. Cl.
*G06F 7/00* (2006.01)
*G06F 17/00* (2006.01)
*G06F 19/00* (2011.01)

(52) U.S. Cl.
USPC ............. 701/64; 701/67; 701/51; 192/3.58; 192/3.63; 477/70; 477/86

(58) Field of Classification Search .................... 701/51, 701/64, 67, 68; 477/70, 86; 192/3.58, 3.61, 192/3.63
See application file for complete search history.

(56) References Cited

U.S. PATENT DOCUMENTS

| | | | |
|---|---|---|---|
| 6,358,180 B1 * | 3/2002 | Kuroda et al. ................. | 477/4 |
| 6,390,214 B1 * | 5/2002 | Takahashi et al. ........... | 180/65.26 |
| 2002/0074173 A1 * | 6/2002 | Morimoto et al. ........... | 180/65.2 |
| 2004/0231951 A1 * | 11/2004 | Hasegawa et al. ............ | 192/220 |
| 2005/0082098 A1 * | 4/2005 | Ito et al. ........................ | 180/65.2 |
| 2005/0283298 A1 * | 12/2005 | Ochi et al. ..................... | 701/67 |
| 2006/0068975 A1 * | 3/2006 | Kobayashi et al. ........... | 477/107 |
| 2006/0116239 A1 * | 6/2006 | Kumazawa et al. .......... | 477/115 |
| 2006/0128527 A1 * | 6/2006 | Zenno et al. .................. | 477/170 |
| 2006/0162979 A1 * | 7/2006 | Usukura et al. ............... | 180/230 |
| 2006/0293823 A1 * | 12/2006 | Miyamaru et al. ............. | 701/51 |
| 2007/0078040 A1 * | 4/2007 | Nobumoto et al. ............ | 477/70 |
| 2007/0149351 A1 * | 6/2007 | Inuta .............................. | 477/70 |
| 2007/0243971 A1 * | 10/2007 | Brevick ......................... | 477/70 |
| 2008/0103663 A1 * | 5/2008 | Hiroi .............................. | 701/54 |

FOREIGN PATENT DOCUMENTS

| | | |
|---|---|---|
| JP | 56-057525 A | 5/1981 |
| JP | 62-275847 A | 11/1987 |
| JP | 09-079374 A | 3/1997 |
| JP | 2001-304307 A | 10/2001 |
| JP | 2006-170224 A | 6/2006 |

* cited by examiner

*Primary Examiner* — Jeffrey Shapiro
(74) *Attorney, Agent, or Firm* — Westerman, Hattori, Daniels & Adrian, LLP

(57) ABSTRACT

When a predetermined time has passed without detection of engine stall and without detection of the neutral state and without detection of a vehicle starting operation, in a first control state in which a clutch is in a disengaged state, a clutch control system effects transition to a second control state in which transition to a third control state is permitted. When a vehicle starting operation is detected in the second control state B in which the clutch is in the disengaged state, a liquid pressure modulator is driven to effect transition to the third control state in which the clutch is put in the engaged state or a partially engaged state. When an engine stall or the neutral state is detected in the second control state, transition to the first control state A is effected.

10 Claims, 5 Drawing Sheets

CLUTCH CONTROL SYSTEM

TECHNICAL FIELD

The present invention relates to a clutch control system, particularly to a clutch control system which makes it possible to reduce the weight of the system as a whole while preventing a large driving force from acting on a transmission, by performing a predetermined vehicle start inhibition control.

BACKGROUND OF THE INVENTION

Automatic transmissions in which a clutch operation at the time of starting the vehicle and gear shift operations during running are performed automatically have been known.

Japanese Patent Laid-open No. Sho 56-57525 discloses a configuration of an automatic transmission for shifting among D (drive: forward running), N (neutral) and R (reverse: reverse running) positions in the transmission by a shift lever operated by the rider (driver), wherein the gear shift from N to D or R is not effected even if the shift lever is operated in the condition where the engine speed or the throttle position (throttle opening) is not less than a predetermined value. According to this configuration, for example in the case where the engine speed is high when the engine is started for starting the vehicle, the switching from N to D or R is inhibited, whereby exertion of a large driving force on the transmission is prevented from occurring.

SUMMARY OF THE INVENTION

However, in a transmission wherein on one hand, a clutch is automatically engaged and disengaged by an actuator, and, on the other hand, a driver's operation on a shift pedal rotates a shift drum so as to shift the gear speed position, it has been difficult to simply apply the technology of Japanese Patent Laid-open No. Sho 56-57525 in which shifting of the gear speed position is restricted.

In addition, use of the device for restricting the shifting of the gear speed position leads to a complicated structure and an increase in the weight of the system as a whole.

The present invention solves the above-mentioned problems involved in the related art and provides a clutch control system which makes it possible to reduce the weight of the system as a whole while preventing a large driving force from acting on a transmission, by performing a predetermined vehicle start inhibition control.

The present invention is characterized in that, in a clutch control system for a clutch operative to engage and disengage the transmission of a rotational driving force from an engine of a vehicle to a drive wheel or wheels through a transmission, the clutch control system includes an actuator for engaging and disengaging the clutch; a controller for controlling the operation of the actuator; a neutral detection unit for detecting a neutral state of the transmission; a vehicle condition detection unit for detecting at least the operating condition of the engine; and a vehicle starting operation detection unit for detecting a vehicle starting operation of the vehicle, wherein the controller permits driving of the clutch in the direction for engagement when a predetermined time has passed without detection of the vehicle starting operation after the neutral state has come to be non-detected.

In addition, the present invention is also characterized in that, in a clutch control system for a clutch operative to engage and disengage the transmission of a rotational driving force from an engine of a vehicle to a drive wheel or wheels through a transmission, the clutch control system includes an actuator for engaging and disengaging the clutch; a controller for controlling the operation of the actuator; a neutral detection unit for detecting a neutral state of the transmission; a vehicle condition detection unit for detecting at least the operating condition of the engine; and a vehicle starting operation detection unit for detecting a vehicle starting operation for the vehicle, wherein the clutch control system has a first control state in which the clutch is in a disengaged state and in which transition to a third control state is inhibited even when the vehicle starting operation is detected, a second control state in which the clutch is in the disengaged state and in which transition to the third control state is permitted according to detection of the vehicle starting operation and a third control state in which the clutch is in a partially engaged state or in an engaged state; the controller effects transition from the first control state to the second control state when a predetermined time has passed with detection of operation of the engine and without detection of the neutral state and without detection of the vehicle starting operation; and the controller effects transition from the second control state to the first control state when operation of the engine is not detected or the neutral state is detected.

Further, the present invention is characterized in that the vehicle starting operation detection unit detects the vehicle starting operation on the basis of at least one of an output signal from a throttle position sensor for detecting the position of a throttle and an output signal from an engine speed sensor for detecting the rotation speed of the engine.

In addition, the present invention is characterized in that the vehicle condition detection unit further detects running of the vehicle; and the controller effects transition from the third control state to the first control state when the neutral state is detected, and effects transition from the third control state to the second control state when non-running of the vehicle is detected.

Still further, the present invention is characterized in that the clutch control system further includes a clutch lever which operates said actuator which engages and disengages the clutch.

According to the first characteristic of the present invention, the controller permits driving of the clutch in the direction for engagement when a predetermined time has passed without detection of a vehicle starting operation after the neutral state has come to be non-detected. Therefore, the need for a device for restricting the shifting of the gear speed position is eliminated, while preventing exertion of a large driving force on the transmission from occurring. Consequently, the weight of the system as a whole can be reduced.

According to the second characteristic of the invention, the clutch control system has the first control state in which the clutch is in a disengaged state and in which transition to the third control state is inhibited even when the vehicle starting operation is detected, the second control state in which the clutch is in the disengaged state and in which transition to the third control state is permitted according to detection of the vehicle starting operation and the third control state in which the clutch is in a partially engaged state or in an engaged state the controller effects transition from the first control state to the second control state when a predetermined time has passed with detection of operation of the engine and without detection of the neutral state and without detection of the vehicle starting operation; and the controller effects transition from the second control state to the first control state when operation of the engine is not detected or the neutral state is detected. Therefore, it is possible to perform a vehicle start inhibition control such that, even if a vehicle starting operation is detected, the clutch is not engaged until predetermined transition conditions are satisfied. This makes it possible, for example even in the case where a vehicle starting operation is carried out at the time of starting the engine, to prevent transmission of a large driving force to the drive wheel(s) from occurring simultaneously with the starting of the engine. As a result, the need for a device for restricting the shifting of the gear speed position is eliminated, and the weight of the system as a whole can be reduced.

In addition, even during operation of the engine, transition to the second control state is not made unless a predetermined time has passed without detection of a vehicle starting operation which is to be detected based on throttle position or the like. Therefore, exertion of a large driving force on the drive wheel(s) due to the engagement of the clutch in the condition of a high engine speed is prevented from occurring. Furthermore, the system is in the first control state when the transmission is in the neutral state, and transition to the second control state does not occur when the vehicle starting operation is being detected in the first control state. Therefore, in the case where the vehicle starting operation is conducted at the time of shifting from the neutral state to a predetermined gear speed position, engagement of the clutch with the result of exertion of a large driving force on the drive wheel(s) or generation of an engine stall is prevented from occurring.

According to the third characteristic of the invention, the vehicle starting operation detection unit detects the vehicle starting operation on the basis of at least one of an output signal from the throttle position sensor for detecting the position of a throttle and an output signal from the engine speed sensor for detecting the rotation speed of the engine. Therefore, a driver's vehicle starting operation can be assuredly detected by the sensor(s).

According to the fourth characteristic of the invention, the vehicle condition detection unit further detects running of the vehicle, and the controller effects transition from the third control state to the first control state when the neutral state is detected, and effects transition from the third control state to the second control state when non-running of the vehicle is detected. Therefore, when the transmission is put into the neutral state after the starting of the vehicle, transition to the first control state occurs, so the clutch is once disengaged, and transition to the third control state is inhibited, whereby the vehicle can be prevented from showing a change in behavior when the transmission is again put into an in-gear condition. Besides, when non-running of the vehicle is detected, i.e., the vehicle is stopped, after the starting of the vehicle, transition to the second control state occurs. In this case, therefore, it is possible to prepare for re-starting of the vehicle, while keeping a predetermined gear speed position.

According to the fifth characteristic of the invention, the clutch control system has the clutch lever which operates the actuator which engages or disengages the clutch. Therefore, a swift vehicle start can be achieved through operating the clutch lever, and the degree of freedom of the driver's choice is enhanced.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
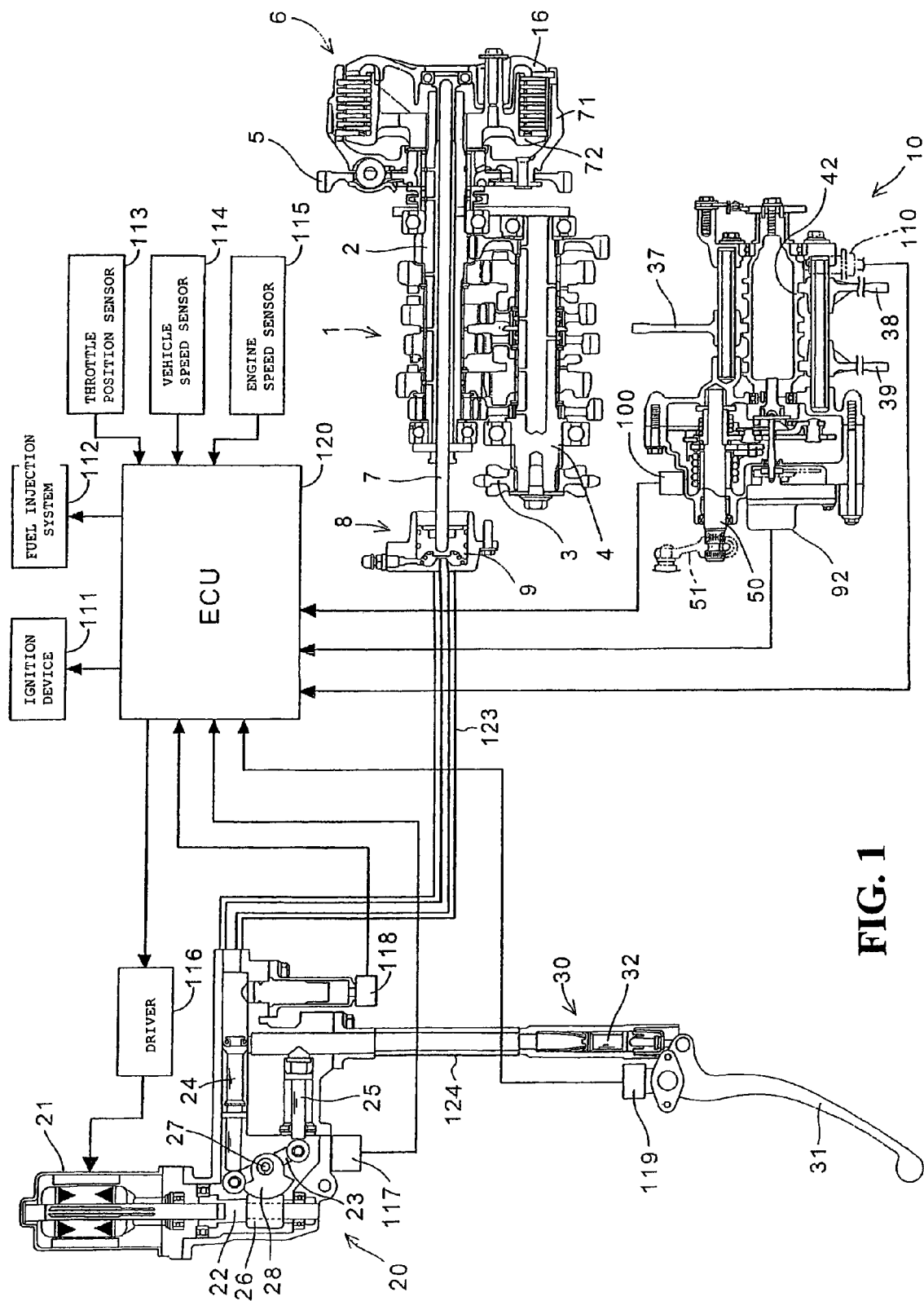
FIG. 1 is a block diagram showing the configuration of a clutch control system according to one embodiment of the present invention, together with the peripheral apparatuses.

Now, a preferred embodiment of the present invention will be described in detail below, referring to the drawings. FIG. 1 is a block diagram showing the configuration of a clutch control system according to one embodiment of the present invention, together with the peripheral apparatuses. A transmission 1 applied to a motorcycle has 1st-speed to 6th-speed transmission gear pairs for transmitting a rotational driving force, between a main shaft 2 as an input shaft and a counter shaft 4 as an output shaft, both of which are rotatably borne on an engine case (not shown) while having axes parallel to each other. Incidentally, the transmission 1 of a normally meshed type, in which the transmission gear pairs are sequentially changed over by intermittently rotating a shift drum, has a configuration generally known as a sequential-type multi-gear-speed transmission for motorcycle. Therefore, detailed description of the transmission 1 is omitted.

A clutch 6 for switching the connection (transmission) and disconnection (non-transmission) of a rotational driving force of an engine serving as a motive power source is provided between the main shaft 2 of the transmission 1 and a crankshaft (not shown) of the engine. The rotational driving force of the engine is transmitted from a primary driven gear 5, meshed with a primary drive gear (not shown) fixed to the crankshaft, to the main shaft 2 through the clutch 6. The rotational driving force transmitted to the main shaft 2 is then transmitted to the counter shaft 4 through one transmission gear pair selected by a gear shift mechanism 10 which will be described later. A drive sprocket 3 is fixed to one end part of the counter shaft 4, and the rotational driving force of the engine is transmitted to the rear wheel (not shown) as a drive wheel through a drive chain (not shown) wrapped around the drive sprocket 3.

The clutch 6 includes a clutch outer 71 which is fixed to the primary driven gear 5 and which holds a plurality of drive friction disks, a clutch inner 72 which is fixed to the main shaft 2 and which holds driven friction disks brought into contact with the drive friction disks to generate a frictional force, and a pressure plate 16 mounted to the main shaft 2 so as to be movable in the axial direction. The pressure plate 16 is normally pushed leftward in the figure by a springy force of a clutch spring, and, due to the pushing force, the frictional force enabling transmission of the rotational driving force of the engine is generated between the drive friction disks and the driven friction disks.

In addition, the pressure plate 16 can be moved in the axial direction by sliding a push rod 7, which penetrates the main shaft 2. In this configuration, the clutch 6 is in an engaged state when the push rod 7 is not slid. On the other hand, when the push rod 7 is pushed by a force against the springy force of the clutch spring and is thereby slid rightwards in the figure, the pressure plate 16 is moved in the direction for separation of the drive friction disks and the driven friction disks from each other, resulting in that the clutch 6 is operated in the direction for disengagement. In this instance, by regulating the pushing force exerted on the push rod 7, a partially engaged state between the engaged state and the disengaged state can also be obtained. The push rod 7 is in abutment on an end part of a hydraulic piston 9 of a clutch slave cylinder 8 fixed to the engine case, and the hydraulic piston 9 pushes the push rod 7 rightwards in the figure when a predetermined oil pressure is supplied into an oil passage 123.

A gear shift mechanism 10 for selecting one gear train for transmitting the rotational driving force is contained in the inside of the engine case, like the transmission 1. The gear shift mechanism 10 is so configured that a shift pedal (not shown) swingably mounted to the vehicle body of the motorcycle is operated by the rider, and an operating force given at the time of the shifting operation turns a shift drum 42, thereby effecting a gear shifting operation. In this embodiment, the shift pedal operated by the rider's left foot is connected to a shift lever 51 fixed to one end part of a shift spindle 50.

The shift drum 42, which has a hollow cylindrical shape, is provided in its surface with three engaging grooves for respective engagement with one-side ends of first to third shift forks 37, 38, 39. Besides, the other-side ends of the first to third shift forks 37 to 39 are engaged respectively with three slidable transmission gears mounted to the main shaft 2 and the counter shaft 4 so as to be slidable in the axial direction. When the shift drum 42 is turned, the first to third shift forks 37 to 39 are slid to predetermined positions in the axial direction which correspond to the gear speed positions, whereby the engaged/disengaged conditions of dog clutches disposed between the slidable transmission gears and the transmission gears adjacent thereto are changed over. As a result, the transmission gear pair by which the rotational driving force of the engine is transmitted is changed over, that is, a gear shifting operation is performed. Incidentally, the dog clutch is a commonly known mechanism for transmitting a rotational driving force between gears adjacent to each other on the same shaft through meshing of a plurality of dog teeth (projected parts) with a plurality of dog holes (recessed parts) in the axial direction.

The gear shift mechanism 10 is provided with a gear position sensor 92 as rotational angle detection means for detecting the rotational angle of the shift drum 42, a neutral switch 110 for detecting the neutral state of the transmission 1 by becoming ON when the shift drum 42 is in a neutral position, and a shift spindle turning amount sensor 100 for detecting the turning amount of the shift spindle 50. Incidentally, according to the gear position sensor 92, the gear speed position of the transmission 1 can be detected based on the rotational angle (turning amount) of the shift drum 42.

A liquid pressure modulator 20 for supplying the clutch slave cylinder 8 with an oil pressure (liquid pressure) is driven by a motor 21 serving as an actuator. When the motor 21 is driven based on a driving signal from a driver 116, a worm gear 26 engaged with a rotary shaft 22 is rotated. The worm gear 26 is meshed with a worm wheel 28 turned about a swing shaft 27. One end of the worm wheel 28 turns by making contact with a swinging member 23 swingable about the swing shaft 27, and a roller provided at one end part of the swinging member 23 is in contact with a first hydraulic piston 24. With this configuration, when the motor 21 is driven to rotate in a predetermined direction, the one end part of the swinging member 23 pushes the first hydraulic piston 24, whereby an oil pressure can be generated in the oil passage 123.

On the other hand, in this embodiment, a clutch master cylinder 30 is provided which is attached to a left-side steering handle bar (not shown) of the motorcycle and which is operated by the rider's left hand. The clutch master cylinder 30 is so configured that when the rider grips a clutch lever 31, the hydraulic piston 32 is pushed so as to generate an oil pressure in an oil passage 124. The oil passage 124 is connected to the liquid pressure modulator 20. When a predetermined oil pressure is generated in the oil passage 124, in this configuration, a second hydraulic piston 25 provided in the liquid pressure modulator 20 is pushed. One end part of the second hydraulic piston 25 is so disposed as to abut on the other end side of the above-mentioned swinging member 23. The swinging member 23 is so provided that it can push the first hydraulic piston 24 by swinging independently from the worm wheel 28. This ensures that, when the second hydraulic piston 25 is pushed, the first hydraulic piston 24 is pushed, irrespectively of the operating condition of the motor 21. Consequently, the rider's operation is given a higher priority in generating an oil pressure in the oil passage 123.

The liquid pressure modulator 20 is provided with a worm wheel turning amount sensor 117 for detecting the turning amount of the worm wheel 28, and an oil pressure sensor 118 for detecting the oil pressure generated in the oil passage 123. In addition, the clutch master cylinder 30 is provided with a clutch operation amount sensor 119 for detecting the operation amount of the clutch lever 31.

An ECU 120 is supplied with signals from a throttle position sensor 113 for detecting the position of a throttle operated in conjunction with a rider's throttle operation, a vehicle speed sensor 114 for detecting the running speed of the motorcycle, and an engine speed sensor 115 for detecting the rotating speed of the engine. In addition, the ECU 120 is supplied also with signals from a shift spindle turning amount sensor 100 as shift pedal operation amount detection means, the gear position sensor 92 and the neutral switch 110, which are provided at the gear shift mechanism 10, and further with signals from the worm wheel turning amount sensor 117 and the oil pressure sensor 118, which are provided at the liquid pressure modulator 20. Based on the signals from the just-mentioned various sensors, the ECU 120 controls an ignition device 111, a fuel injection system 112, and the driver 116.

According to the configuration as above, a manual shift operation not requiring any clutch operation can be achieved by a process in which a turning motion of the shift drum is effected by the rider's operating force and only the engagement/disengagement of the clutch is automatically controlled. This makes it possible to obtain an operation feeling of practically turning the shift drum through the shift pedal, unlike in the case of an automatic transmission in which the turning motion of the shift drum is also effected by a motor.

Figure 2:
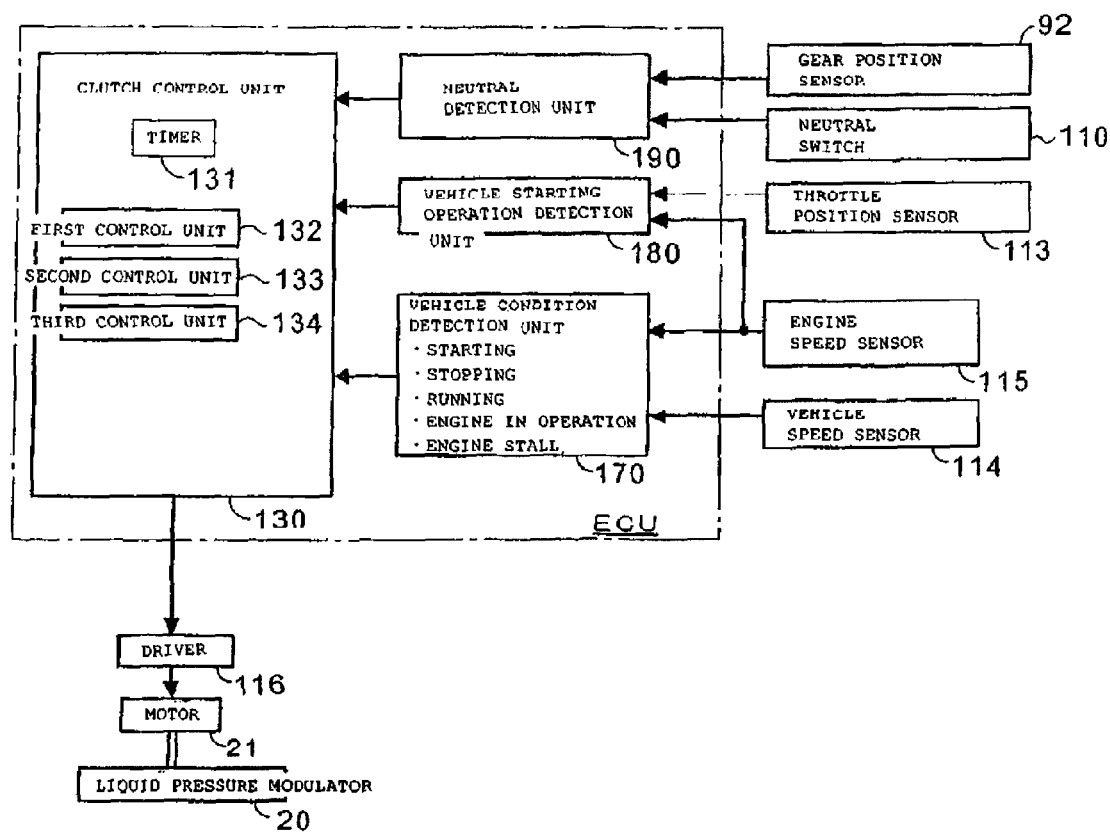
FIG. 2 is a block diagram showing the configuration of the clutch control system according to one embodiment of the invention.

FIG. 2 is a block diagram showing the configuration of the clutch control system according to one embodiment of the present invention. The same symbols as used above denote the parts which are the same as or equivalent to those shown above. The ECU 120 includes a clutch control unit 130 as control means for controlling the engagement/disengagement of the clutch 6 by driving the liquid pressure modulator 20, neutral detection unit 190 for detecting that the transmission is in the neutral state, vehicle starting operation detection unit 180 for detecting that the rider's vehicle starting operation has been made, and vehicle condition detection unit 170 for detecting the running condition(s) of the vehicle. In addition, the clutch control unit 130 includes a timer 131 for counting a predetermined time, and first to third control units 132 to 134 which will be described later.

During normal running of the vehicle, the clutch control unit 130 automatically controls the engagement/disengagement of the clutch 6, based on the rider's vehicle starting operation and gear shifting operation, so as to achieve smooth running of the vehicle. In this embodiment, further, the clutch control unit 130 is set to control disengagement of the clutch 6 at a predetermined timing so as to prevent the problem of transmission of a large driving force to the drive wheel or generation of engine stall, irrespectively of the rider's vehicle starting operation.

The neutral detection unit 190 detects that the transmission 1 is in the neutral state, based on an output signal from the gear position sensor 92 for detecting the rotational angle of the shift drum 42 or from the neutral switch 110 for detecting that the shift drum 42 is in the neutral position. Besides, it is also possible for the neutral detection unit 190 to detect the neutral state, based on both the gear position sensor 92 and the neutral switch 110. This configuration makes it possible to detect the neutral state more assuredly, as compared to the system of detecting the neutral state through either one of the sensors.

The vehicle starting operation detection unit 180 detects that the rider's vehicle starting operation has been made, based on an output signal from the throttle position sensor 113 or the engine speed sensor 115. For example, when the throttle position has exceeded a predetermined position or when the engine speed has exceeded a predetermined speed, the vehicle starting operation detection unit 180 can detect this situation as the vehicle starting operation. In addition, the vehicle starting operation may be determined also by judging, for example, whether the throttle position has exceeded a predetermined position during operation of the engine, based on both output information from the sensor 113 and output information from the sensor 115.

The vehicle condition detection unit 170 can detect the various operating conditions of the vehicle (starting, stopping, running, engine in operation, engine stall, etc.), based on output signals from the engine speed sensor 115 and the vehicle speed sensor 114. For example, as to the starting condition of the vehicle, when the engine is in operation and the vehicle speed has begun to increase from zero, the vehicle can be judged as having been started. When the engine is in operation and the vehicle speed is not less than a predetermined value, the vehicle can be judged as running.

The clutch control unit 130 controls the oil pressure generated in the liquid pressure modulator 20, based on output signals from the neutral detection unit 190, the vehicle starting operation detection unit 180 and the vehicle condition detection unit 170, to thereby control the clutch 6.

Figure 3:
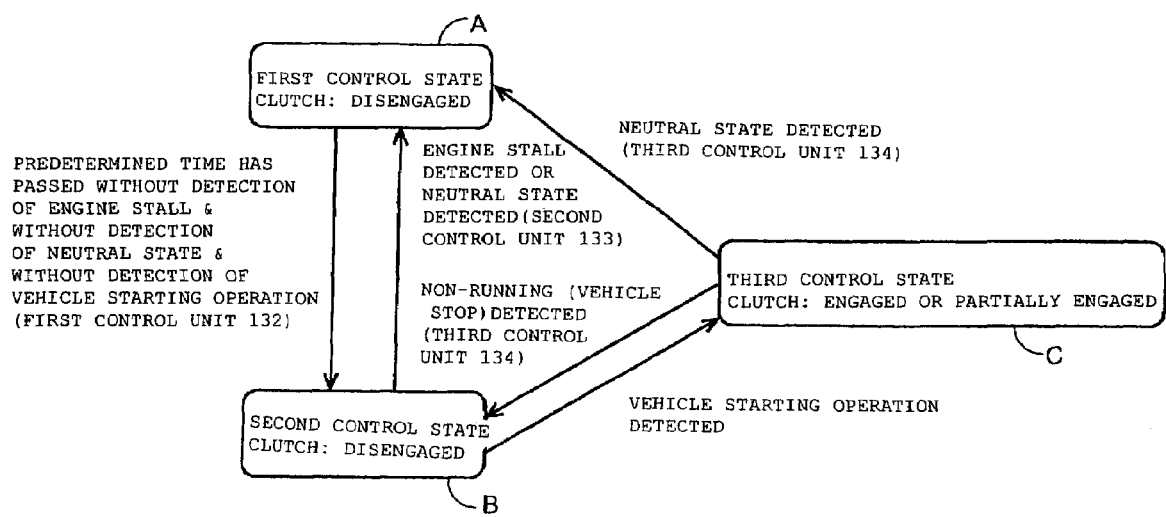
FIG. 3 is a state transition diagram showing the configuration of clutch control according to one embodiment of the invention.

FIG. 3 is a state transition diagram showing the configuration of clutch control according to one embodiment of the present invention. As controlled states of the clutch 6 (hereinafter referred also to simply as "clutch"), there are set a first control state A in which the clutch is disengaged, a second control state B in which the clutch is disengaged like in the first control state A, and a third control state C in which the clutch is in a partially engaged or engaged state. Incidentally, a partially engaged state of the clutch (partial clutch engagement state) is an intermediate engaged state between the completely engaged state and the completely disengaged state of the clutch.

Besides, the first control state A and the second control state B are the same as each other in that the clutch is in the disengaged state, but they differ from each other in that direct transition from the first control state A to the third control state C cannot be made whereas direct transition from the second control state B to the third control state C can be made. In other words, as shown in the state transition diagram, the clutch control is so set that transition from the first control state A to the third control state C can be achieved only by way of the second control state B.

In this embodiment, in the case where the controlled state of the clutch is the first control state A, transition to the second control state B is effected by the first control unit 132 when a predetermined time has passed without detection of engine stall and without detection of the neutral state and without detection of the vehicle starting operation. This corresponds to the case where vehicle-stop-with-idling in the in-gear condition with a predetermined transmission gear pair selected has continued for a predetermined time. Incidentally, the predetermined time is counted by the timer 131 in the clutch control unit 130.

Besides, the clutch control is so set that when the vehicle starting operation is detected in the second control state B, transition to the third control state C in which the clutch is put in the engaged state or a partially engaged state is effected. This corresponds to a series of operations in which, upon detection of the vehicle starting operation during vehicle-stop-with-idling in the in-gear condition, the clutch is brought into a predetermined engaged state for transmitting the rotational driving force of the engine to the drive wheel.

As above-mentioned, the clutch is in the disengaged state both in the first control state A and in the second control state B. According to the state transition diagram, however, detection of the vehicle starting operation in the first control state A does not result in transition to the third control state C. Therefore, when the clutch is in the first control state A, starting of the vehicle is inhibited even if the rider's vehicle starting operation is detected.

In order to attain transition from the first control state A to the second control state B in which transition to the third control state C is permitted, the predetermined condition that a predetermined time has passed without detection of engine stall and without detection of the neutral state and without detection of the vehicle starting operation must be satisfied. Therefore, such a trouble as engagement of the clutch in the condition of a high engine speed can be prevented from occurring. This makes it possible to prevent a large driving force from being exerted on the drive wheel at the time of vehicle start. The above-mentioned condition for transition from the first control state A to the second control state B is set for accepting the vehicle starting operation only during the vehicle-stop-with-idling in the in-gear condition. Incidentally, if the vehicle starting load is great relative to the rotational driving force of the engine at the time of engaging the clutch, there may take place an engine stall in which the engine stops, instead of sudden start of the vehicle. However, in this embodiment, such an engine stall can be prevented from occurring, since engagement of the clutch is inhibited.

Incidentally, the clutch control is so set that when an engine stall or the neutral state is detected in the condition where the controlled state of the clutch is the second control state B, return to the first control state A is effected by the second control unit 133. This setting is for ensuring that when the vehicle has entered a condition unsuitable for a starting motion before detection of a vehicle starting operation, the clutch is again returned to the first control state A in which engagement of the clutch is inhibited. In this case, it is necessary to restart the engine or to put the transmission into an in-gear condition, thereby again effecting the transition to the second control state B.

In addition, the clutch control is so set that when the vehicle stop is detected in the third control state C, return to the second control state B is effected by the third control unit 134. This setting ensures that when the vehicle is momentarily stopped while keeping the in-gear condition, the second control state B is maintained and, hence, smooth restarting of the vehicle is enabled. On the other hand, the clutch control is so set that when the neutral state is detected in the third control state C, return to the first control state A is effected by the third control unit 134. In this case, also, it is necessary for restarting the vehicle to put the transmission into an in-gear condition and to make transition to the second control state B. This corresponds to a series of operations in which, when the transmission is put into the neutral state during running, the clutch is immediately disengaged, and engagement of the clutch is inhibited until a condition suitable for a vehicle starting motion is established.

Figure 4:
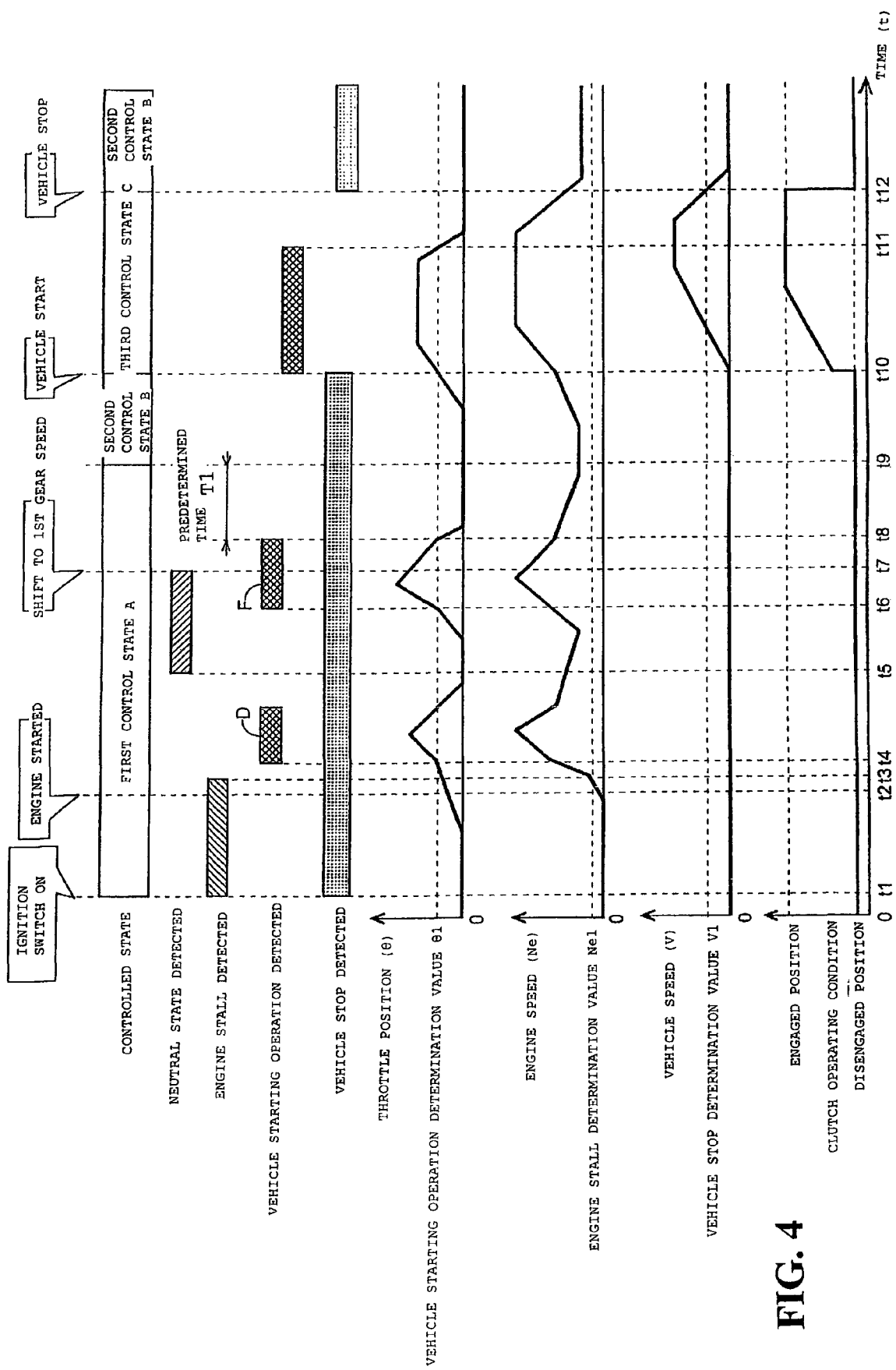
FIG. 4 is a time chart showing the flow of clutch control according to the present embodiment.

FIG. 4 is a time chart showing the flow of clutch control according to this embodiment. The time chart corresponds to the flow in which after starting of the engine, the vehicle is started by making a gear shift from neutral to 1st gear speed, and thereafter the vehicle is made to run, until coming to a momentary stop. In this figure, the controlled states of the clutch are shown in the uppermost row, and the four band graphs thereunder represent the respective presence or absence of detection of neutral state, detection of engine stall, detection of vehicle starting operation, and detection of vehicle stop. Besides, the four line graphs represent the throttle position detected by the throttle position sensor 113, the engine speed detected by the engine speed sensor 115, the vehicle speed detected by the vehicle speed sensor 114, and the operating condition of the clutch detected by the worm wheel turning amount sensor 117 (see FIG. 1), respectively.

First, when an ignition switch is turned ON and a main power supply is thrown in at time t1, the ECU 120 is supplied with electric power, and detection of signals by the sensors is started. In this operation example, the main power supply is thrown in under an in-gear condition where a predetermined gear speed is selected, so that only the detection of engine stall condition and the detection of non-running (vehicle stop) condition are started. In the clutch control system according to this embodiment, the engine can be started in an in-gear condition, so that it is unnecessary to put the transmission into the neutral state each time the engine is to be started. Incidentally, the controlled state of the clutch is set to the first control state A at the time when the main power supply is thrown in.

Subsequently, with the engine started by the rider at time t2, the engine speed exceeds an engine stall determination value Ne1 at time t3, whereon the engine stall condition becomes non-detected. In this operation example, the rider carries out a throttle operation at the time of starting the engine; therefore, at time t4, the throttle position exceeds a vehicle starting operation determination value θ1, and the vehicle starting operation D is detected. However, since the controlled state of the clutch at time t4 is the first control state A, the clutch is prevented from being engaged with the result of sudden start of the vehicle or an engine stall.

Next, at time t5, the transmission 1 is shifted to the neutral state by a rider's gear shifting operation, and detection of the neutral state is started. At time t6, again, the throttle position exceeds the vehicle starting operation determination value θ1, and the vehicle starting operation F is detected. However, since the controlled state of the clutch is still the first control state A at time t6, the clutch is prevented from being engaged with the result of sudden start of the vehicle or an engine stall.

The detection of the vehicle starting operation F which has begun at time t6 is changed, at time t8, to non-detection because the throttle position is reduced to or below the vehicle starting operation determination value θ1. On the other hand, at time t7 within the period of detection of the vehicle starting operation F, the transmission 1 can be shifted from neutral to 1st gear speed by a rider's gear shifting operation. As a result, at time t8, non-detection of engine stall and non-detection of neutral state and non-detection of vehicle starting operation are all established, and the clutch control unit 130 starts counting of a predetermined time T1 by the timer 131.

Incidentally, the counting of the predetermined time has also been started upon completion of the detection of the vehicle starting operation D mentioned above. In this embodiment, however, the first counting of the predetermined time has been stopped at time t5, due to the detection of the neutral state at time t5 before the lapse of the predetermined time T1.

Next, at time t9 upon the lapse of the predetermined time T1, transition of the controlled state of the clutch to the second control state B is made, resulting in that a rider's vehicle starting operation can be accepted. In this operation example, at time t10, the throttle position exceeds the vehicle starting operation determination value θ1, whereby transition of the controlled state of the clutch to the third control state C is effected. Consequently, the clutch is put into a predetermined engaged state, the rotational driving force of the engine is transmitted to the drive wheel, and the vehicle is started. Clutch engagement at the time of vehicle start is so set that the clutch is put into a partially engaged state and is then completely engaged, for ensuring smooth starting of the vehicle. Incidentally, the duration of the partially engaged state and the like factors can be arbitrarily adjusted based on such information as gear speed position and throttle position.

Subsequently, after a predetermined running period for which the third control state C is continued, the rider closes the throttle at time t11, whereby the throttle position is reduced to or below the vehicle starting operation determination value θ1. Attendant on this, the vehicle starts decelerating, and the vehicle speed is lowered to or below a vehicle stop determination value V1 at time t12. As a result, non-running (vehicle stop) condition is again detected, and transition of the controlled state of the clutch from the third control state C to the second control state B is effected.

Figure 5:
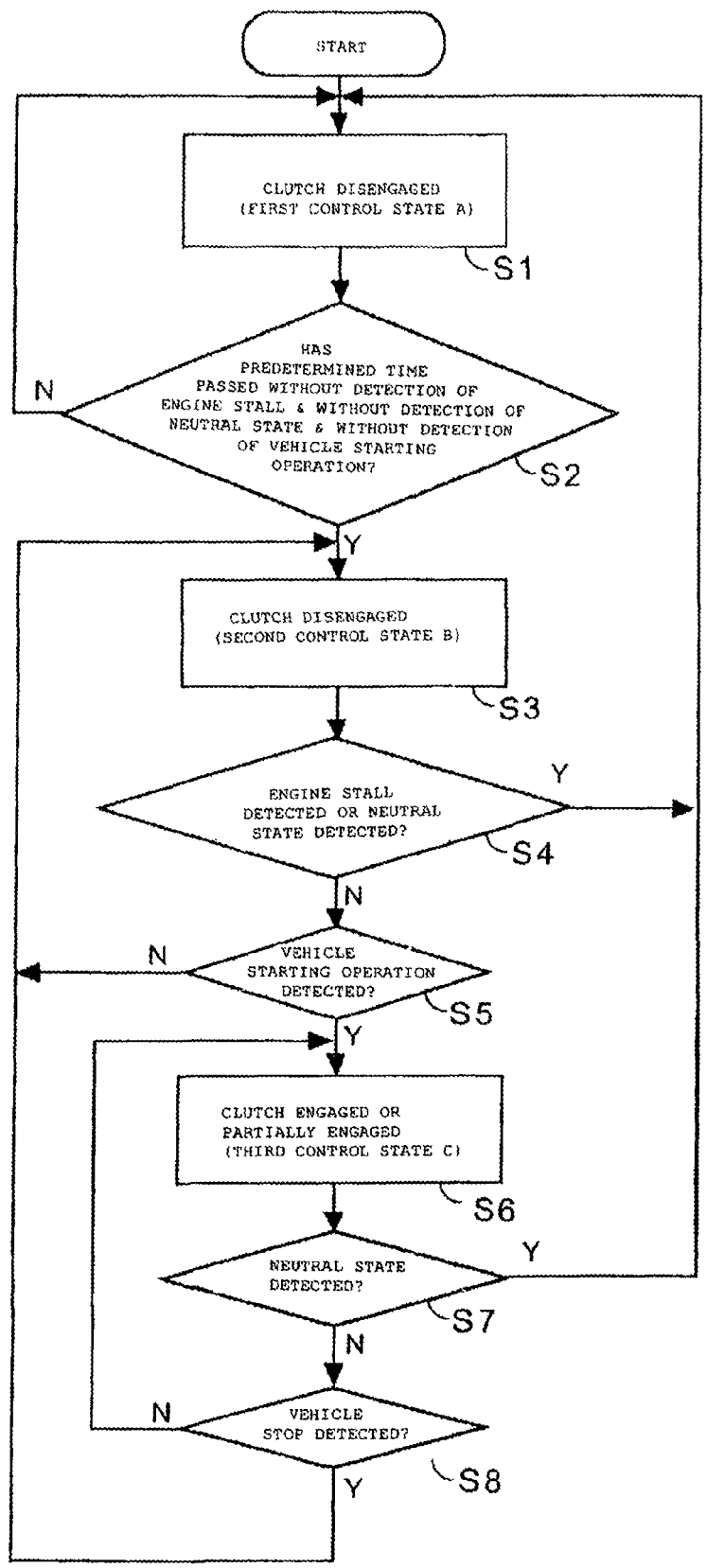
FIG. 5 is a flow chart showing the flow of clutch control according to the present embodiment.

FIG. 5 is a flow chart showing the flow of clutch control according to this embodiment. The flow chart corresponds to the state transition diagram shown in FIG. 3. First, in step S1, clutch control is in the first control state A in which the clutch is in the disengaged state. In step S2, it is judged whether or not a predetermined time has passed in the condition where engine stall is non-detected and the neutral state is non-detected and the vehicle starting operation is non-detected. When the judgment at step S2 is affirmative, step S3 is entered, to make transition to the second control state B in which the disengaged state of the clutch is maintained. Incidentally, when the judgment at step S2 is negative, the control process returns to step S1, and the first control state A is maintained.

Subsequently, in step S4, it is judged whether or not an engine stall state or the neutral state is detected. When the judgment at step S4 is negative, step S5 is entered. On the other hand, when the judgment at step S4 is affirmative, the control process goes to step S1, thereby returning to the first control state A.

In step S5, it is judged whether or not the vehicle starting operation is detected. When the judgment is affirmative, step S6 is entered, where transition to the third control state C in which the clutch is put in the engaged state or a partially engaged state is effected, for carrying out the vehicle starting motion. Incidentally, when the judgment at step S5 is negative, the control process returns to step S3, and the second control state B is maintained.

In step S7, it is judged whether or not the neutral state is detected. When the judgment is affirmative, the control process goes to step S1, thereby returning to the first control state A in which the clutch is disengaged. On the other hand, when the judgment at step S7 is negative, step S8 is entered, where it is judged whether or not the non-running (stop) condition of the vehicle is detected.

When the judgment at step S8 is negative, the control process returns to step S6, and the third control state C is maintained. When the judgment at step S8 is affirmative, the vehicle is deemed as being at a momentary stop, and clutch control returns to the second control state B in which swift restarting of the vehicle is enabled. The transition control of the controlled state of the clutch as above-described is continually carried out until the ignition switch of the vehicle is turned OFF.

As above-described, according to the clutch control system of the present invention, as controlled states of the clutch, there are set the third control state C in which the clutch is put in a predetermined engaged state, the first control state A in which the clutch is in the disengaged state and in which transition to the third control state C is inhibited even when the vehicle starting operation is detected, and the second control state B in which the clutch is in the disengaged state and in which transition to the third control state C is permitted according to a rider's vehicle starting operation. When, in the first control state A, the predetermined time T1 has passed during operation of the engine without detection of the neutral state and without detection of the vehicle starting operation, transition to the second control state B is effected. On the other hand, when engine stall or the neutral state is detected in the second control state B, transition to the first control state A is effected. Therefore, it is possible to carry out a vehicle start inhibition control in which the clutch is not engaged even upon detection of the vehicle starting operation until the predetermined transition conditions are satisfied. This ensures that the clutch is not engaged in the condition unsuitable for the vehicle starting operation, whereby such a problem as exertion of a large driving force on the drive wheel and generation of engine stall can be prevented from occurring. In addition, the need for a device for restricting the shifting of the gear speed position is eliminated, while preventing exertion of a large driving force on the transmission from occurring. Thus, the weight of the system as a whole can be reduced.

Incidentally, the layout and configurations of the transmission, the gear shift mechanism, the liquid pressure modulator, the ECU (electric control unit), and the various sensors, the methods of detection of the neutral state, detection of the vehicle starting operation, detection of the conditions of the vehicle, and detection of the non-running (vehicle stop) condition, etc. are not limited to those in the above-described embodiment, and various modifications thereof are possible. For example, the setting of the predetermined time included in the conditions for transition from the first control state A to the second control state B, the setting of the clutch engagement control carried out in the third control state C, etc. can be arbitrarily changed according to the configurations of the transmission and the like. Incidentally, the clutch control system according to the present invention is applicable not only to the above-mentioned motorcycle but also to three-wheel and four-wheel vehicles which have an engine as a motive power source.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A clutch control system for a clutch operative to engage and disengage transmission of a rotational driving force from an engine of a vehicle to a drive wheel through a transmission, comprising:
   an actuator which engages and disengages said clutch;
   a controller which controls operation of said actuator;
   a neutral detection unit which detects whether said transmission is in neutral;
   a vehicle condition detection unit which detects at least an operating condition of the vehicle; and
   a vehicle starting operation detection unit which detects a vehicle starting operation of said vehicle,
   wherein, after said transmission is not detected as being in neutral, said controller permits said actuator to move said clutch in the direction for engagement when a predetermined time has passed without detection of the vehicle starting operation and without detection of an engine stall condition, and
   wherein, after said transmission is not detected as being in neutral, said controller does not permit said actuator to move said clutch in the direction for engagement when a predetermined time has not passed without detection of the vehicle starting operation and without detection of the engine stall condition.

2. A clutch control system for a clutch operative to engage and disengage transmission of a rotational driving force from an engine of a vehicle to a drive wheel through a transmission, comprising:
   an actuator which engages and disengages said clutch;
   a controller which controls operation of said actuator;
   a neutral detection unit which detects whether said transmission is in neutral;
   a vehicle condition detection unit which detects at least an operating condition of the vehicle; and
   a vehicle starting operation detection unit which detects a vehicle starting operation of said vehicle,
   wherein said clutch control system includes
      a first control state in which said clutch is disengaged and in which transition to a third control state is inhibited even when the vehicle starting operation is detected,
      a second control state in which said clutch is disengaged and in which transition to the third control state is permitted when the vehicle starting operation is detected, and
      the third control state in which said clutch is engaged or partially engaged,
   wherein said controller effects transition from the first control state to the second control state when a predetermined time has passed with detection of the operating condition of the vehicle being an engine stall condition, without detection of the transmission being in neutral and without detection of the vehicle starting operation; and
   wherein said controller effects transition from the second control state to the first control state when the operating condition of the vehicle being the engine stall condition is not detected or when the transmission is detected as being in neutral.

3. The clutch control system as set forth in claim 2, wherein said vehicle starting operation detection unit detects the vehicle starting operation on the basis of at least one of an output signal from a throttle position sensor which detects the position of a throttle and an output signal from an engine rotation speed sensor which detects the rotation speed of said engine.

4. The clutch control system as set forth in claim 2,
wherein said vehicle condition detection unit further detects running of said vehicle;
wherein said controller effects transition from the third control state to the first control state when the transmission is detected as being in neutral, and
wherein said controller effects transition from the third control state to the second control state when non-running of said vehicle is detected.

5. The clutch control system as set forth in claim 3,
wherein said vehicle condition detection unit further detects running of said vehicle;
wherein said controller effects transition from the third control state to the first control state when the transmission is detected as being in neutral, and
wherein said controller effects transition from the third control state to the second control state when non-running of said vehicle is detected.

6. The clutch control system as set forth in claim 1, further comprising a clutch lever which operates said actuator which engages or disengages said clutch.

7. The clutch control system as set forth in claim 2, further comprising a clutch lever which operates said actuator which engages or disengages said clutch.

8. The clutch control system as set forth in claim 3, further comprising a clutch lever which operates said actuator which engages or disengages said clutch.

9. The clutch control system as set forth in claim 4, further comprising a clutch lever which operates said actuator which engages or disengages said clutch.

10. The clutch control system as set forth in claim 5, further comprising a clutch lever which operates said actuator which engages or disengages said clutch.

* * * * *